United States Patent [19]
Levy

[11] Patent Number: 5,574,649
[45] Date of Patent: Nov. 12, 1996

[54] POSITION-LOCATING METHOD AND APPARATUS INCLUDING CORRECTIONS FOR ELEVATIONAL CHANGES

[76] Inventor: Nessim I. Levy, 13 Habrosh St., 56 516 Savyon, Israel

[21] Appl. No.: 461,467

[22] Filed: Jun. 5, 1995

Related U.S. Application Data

[63] Continuation of Ser. No. 893,149, Jun. 3, 1992, abandoned.

[30] Foreign Application Priority Data

Sep. 27, 1991 [IL] Israel .......................................... 99596

[51] Int. Cl.⁶ .................. G01C 21/00; G06G 7/78
[52] U.S. Cl. .................... 364/449; 364/444; 364/457; 364/450; 364/443; 342/457; 342/357; 340/990; 340/995; 340/988; 340/436; 73/178 R; 73/146
[58] Field of Search ...................... 364/444, 449, 364/450, 459, 453, 424.01, 460, 436, 424.02; 340/990, 995, 988, 436; 342/457, 357, 120, 63–65, 456; 73/178 R, 146

[56] References Cited

U.S. PATENT DOCUMENTS

| | | | |
|---|---|---|---|
| 4,107,689 | 8/1978 | Jellinek | 364/450 |
| 4,144,571 | 3/1979 | Webber | 364/450 |
| 4,520,445 | 5/1985 | Kearns | 364/450 |
| 4,584,646 | 4/1986 | Chan et al. | 364/449 |
| 4,593,359 | 6/1986 | Sadeh | 364/443 |
| 4,731,613 | 3/1988 | Endo et al. | 342/357 |
| 4,774,672 | 9/1988 | Tsunoda et al. | 364/449 |
| 4,812,845 | 3/1989 | Yamada et al. | 340/995 |
| 4,823,287 | 4/1989 | Thompson | 364/522 |
| 4,924,402 | 5/1990 | Ando et al. | 364/449 |
| 4,939,663 | 7/1990 | Baird | 364/449 |
| 4,970,682 | 11/1990 | Beckwith, Jr. et al. | 364/900 |
| 4,977,509 | 12/1990 | Pitchford et al. | 364/449 |
| 5,043,902 | 8/1991 | Yokoyama et al. | 364/449 |
| 5,058,023 | 10/1991 | Kozikaro | 364/449 |
| 5,060,162 | 10/1991 | Ueyama et al. | 364/449 |
| 5,072,396 | 12/1991 | Fitzpatrick et al. | 364/450 |
| 5,075,693 | 12/1991 | McMillan et al. | 342/457 |
| 5,140,532 | 8/1992 | Beckwith, Jr. et al. | 395/101 |
| 5,187,977 | 2/1993 | Koschorek et al. | 73/146 |
| 5,243,528 | 9/1993 | Lefebvre | 340/995 |
| 5,272,639 | 12/1993 | McGuffin | 364/449 |
| 5,311,173 | 5/1994 | Komura et al. | 340/995 |

FOREIGN PATENT DOCUMENTS

| | | |
|---|---|---|
| 3232266 | 3/1984 | Germany . |
| 3439000 | 4/1986 | Germany . |

*Primary Examiner*—Kevin J. Teska
*Assistant Examiner*—Jacques Louis-Jacques
*Attorney, Agent, or Firm*—Benjamin J. Barish

[57] ABSTRACT

A method and apparatus for navigation of a vehicle travelling over a terrain in which the changes in elevation of the vehicle are continuously measured, in addition to the distance and heading. The distance measurements are continuously corrected by the changes in elevation in determining the instantaneous location of the vehicle with respect to a known point. The approximate location can also be obtained from a satellite GPS (global positioning system). The measured elevation may also be compared with the elevation in reference data, such as data in a three-dimensional map of the area to prevent the accumulation of errors or to make the determined location more precise.

14 Claims, 3 Drawing Sheets

POSITION-LOCATING METHOD AND APPARATUS INCLUDING CORRECTIONS FOR ELEVATIONAL CHANGES

This application is a continuation of application Ser. No. 893,149, filed Jun. 3, 1992 now abandoned.

FIELD AND BACKGROUND OF THE INVENTION

The present invention relates to a method and apparatus for locating the position of a land vehicle or other object travelling over a terrain. The invention is particularly useful in vehicle navigation systems based on dead reckoning and/or GPS (global positioning systems), and is described below with respect to both applications.

The dead reckoning navigation system for navigating a land vehicle over terrain is based on the use of sensors installed in the vehicle for measuring (1) the distance travelled by the vehicle, and (2) the heading (i.e., angular direction or azimuth) of the vehicle. From these two measurements, the instantaneous location of the vehicle with respect to the known starting point can be continuously determined.

One of the drawbacks of the dead reckoning navigation method, however, is the accumulation of errors. For this reason, advanced navigation systems based on dead reckoning generally include an independent source of information to permit periodic correction of errors. For example, some dead reckoning navigation systems include additional information from a digitized map (i.e., road map) of the area over which the vehicle travels. The map is used in a map-matching technique to provide known reference data, such as intersection points, which may be compared with the calculated positions for correcting errors and thereby preventing an accumulation of errors. However, even when such correction or recalibration data is provided by a separate source of information, the accuracy of the dead reckoning system still depends on the distance travelled from the last reference calibration point, and the larger the distance travelled before being recalibrated, the greater the possible error. Moreover, such map-matching techniques are used only with respect to known roads, and not to terrains where no road exists.

Navigation systems based on GPS are also known, but in low-cost civilian applications they are generally capable of determining only the approximate location of an object on the face of the globe, i.e., within about 150 meters.

OBJECTS AND BRIEF SUMMARY OF THE INVENTION

An object of the present invention is to provide both an improved method and an improved apparatus for more precisely locating the position of a vehicle travelling over a terrain.

According to the present invention, there is provided a method and apparatus for determining the instantaneous location of a land vehicle travelling on a terrain, measuring the changes in elevation of the land vehicle as it travels on the terrain, and utilizing the measured changes in the elevation for correcting the measured approximate location in order to determine the precise instantaneous location of the land vehicle on the terrain. This is done by storing reference data which includes changes in sign in the elevation slope of known locations in the terrain; and utilizing such reference data known locations, when changes in sign in the elevation slope of the measured data are encountered, for periodically correcting the instantaneous location of the land vehicle on the terrain.

It will thus be seen that the continuous measurement of the elevation, in addition to distance and heading of the vehicle while travelling over the terrain, provides an additional source of independent reference data and thereby improves the accuracy of the navigation system in two important respects:

First, in the normal dead reckoning navigation system, the distance travelled by the vehicle is usually measured by the number of rotations of the vehicle wheels, or the like. Thus, if the vehicle is travelling along an ascent or descent, the measured distance will be the actual length of the ascent or descent slope; this measured distance will therefore be greater than the horizontal component of the travelled distance, which is the relevant distance in the location determination, thereby introducing an error. However, by continuously measuring changes in elevation, the computer can compensate for this source of error by calculating continuously the corresponding projected horizontal distance.

In addition, the reference data, such as a digitized three-dimensional map over which the vehicle travels, is also used in the described preferred embodiment for frequently correcting or recalibrating the computed position data with the reference data. For example, the peaks and valleys of ascents and descents constitute points of changes in sign in the elevation changes; these points, as actually measured, can be compared with the known points of sign changes in the three-dimensional reference map, to be used as additional reference points and thereby to enable frequent recalibration or correction of errors, and thus decrease the accumulation of errors. The changes in gradient (slope), as well as the complete elevational profile, can also be used for recalibration and correction of errors.

According to a further described embodiment, the approximate location can be measured, not by dead reckoning, but rather by a satellite GPS (global positioning system). As indicated earlier, such systems are known, but in low-cost civilian applications they are generally capable of determining only the approximate location, i.e. within approximately 150 meters, of the object on the face of the globe. Thus, by continuously measuring the elevation of the vehicle as it travels over the terrain, its location as approximately obtained by GPS can be more precisely determined by using the elevation measurements.

More particularly, a further embodiment of the invention is described wherein the above-mentioned operation (a) is performed by measuring the approximate location of the vehicle by means of a three-dimensional satellite global positioning system; operation (b) is performed by measuring the changes in elevation of the land vehicle as it travels on the terrain; and operation (c) is performed by (i) inputting reference data which includes elevation parameters of known locations in the terrain over which the land vehicle is travelling; and (ii) comparing the elevation parameters of the reference data having known locations with the elevation parameters of the measured data whose location was determined by dead reckoning for periodically correcting the instantaneous location of the land vehicle.

According to further aspects of the invention, there is also provided an apparatus for determining the location of a vehicle in accordance with the above methods.

Further features and advantages of the invention will be apparent from the description below.

BRIEF DESCRIPTION OF THE DRAWINGS

The invention is herein described, somewhat diagrammatically and by way of example only, with reference to the accompanying drawings, wherein.

DESCRIPTION OF PREFERRED EMBODIMENTS

Figure 1:
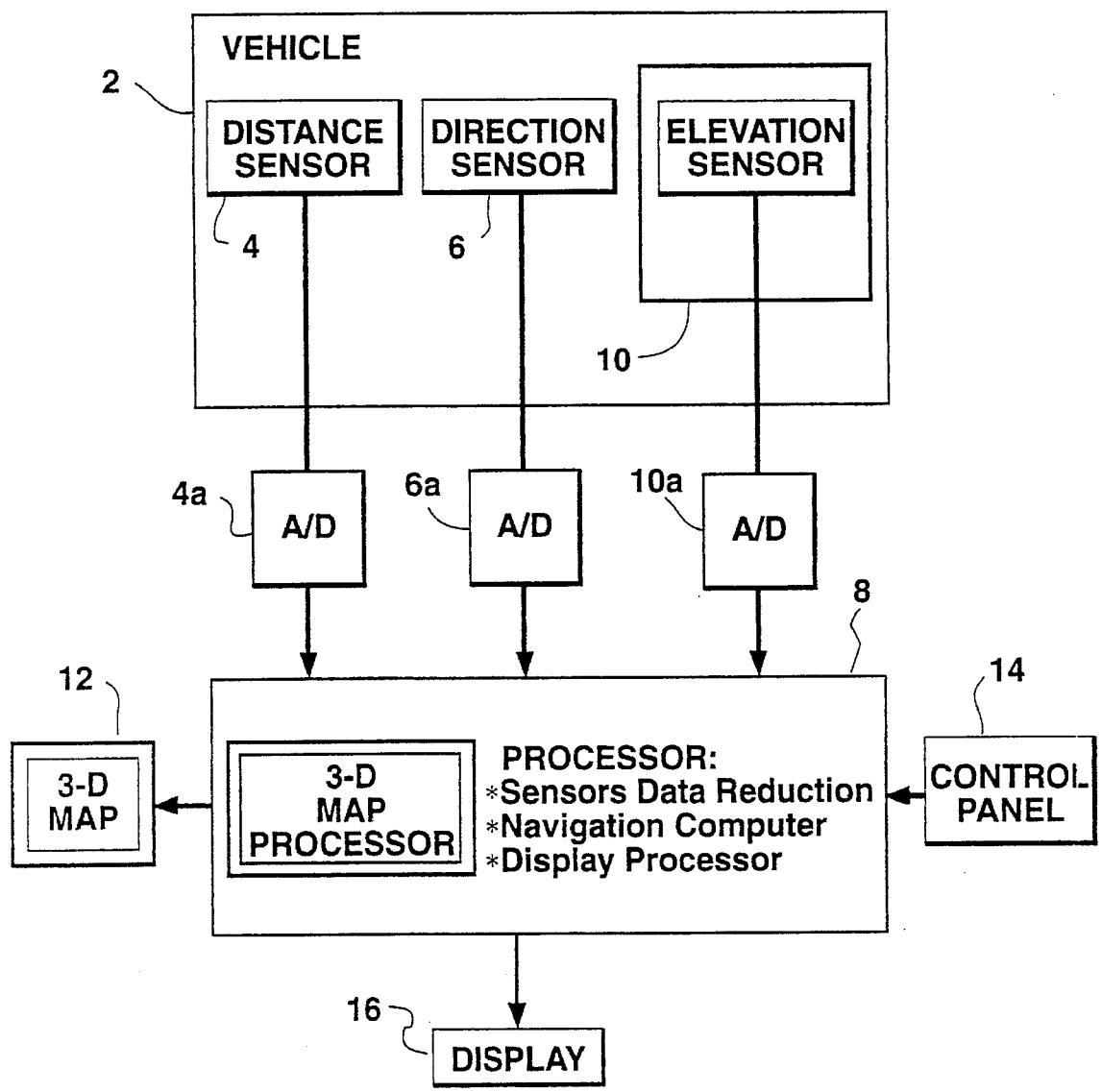
FIG. 1 is a block diagram illustrating a dead reckoning navigation system constructed in accordance with the present invention.

The Embodiment of FIG. 1

The system illustrated in FIG. 1 is intended for the navigation of a land vehicle, generally designated 2, travelling over a terrain which may or may not be covered by roads. Thus, the vehicle 2 includes a distance sensor 4 for continuously sensing the distance travelled by the vehicle over the terrain from a known point, and a direction (heading or azimuth) sensor 6 for continuously measuring the heading of the vehicle when travelling from the known point. The outputs of the two sensors 4, 6 are fed, via analog-to-digital converters 4a, 6a, to a digital processor 8 which continuously computes, from the information supplied by sensors 4 and 6, the instantaneous location of the vehicle with respect to the known point by the well-known dead reckoning technique.

In the system illustrated in FIG. 1, however, the vehicle 2 also includes an elevation sensor 10 which continuously measures the elevation, or merely changes in elevation, of the vehicle 2 while travelling over the terrain. The output of the elevation sensor 10 is fed, via an analog-to-digital converter 10a, to the digital processor 8. This elevation information is also used by the processor 8, in a manner to be described more particularly below, for computing the instantaneous location of the vehicle with respect to the known point.

Digital processor 8 further includes an input 12 of reference data which is used for calibrating or correcting the computed instantaneous location of the vehicle. Thus, the reference data 12 may be in the form of a three-dimensional map in digitized format of the area over which the vehicle travels and including the normal two-dimensional data (e.g., roads, intersections, sites, etc.), and also the elevational data. The reference map 12, which may be stored in the navigation system, identifies reference points along the vehicle travelling path, such as sharp curvatures in the road, turns at intersections, etc., whose locations are known. The tracked or computed data obtained from the sensors 4 and 6, is matched with the reference data obtained from the map 12, and any deviations in the computed locations from the reference locations constitute errors. The processor 8 is programmed to check the known reference locations with the computed locations, identify the errors, and correct the errors, so as to prevent the accumulation of such errors according to well-known map matching technique.

The reference map 12 in the system illustrated in FIG. 1, however, includes a further parameter, namely the elevations of the mapped area, and particularly of known reference points along the path of travel. These elevation reference points are also used, in accordance with the present invention, for preventing the accumulation of errors during the dead reckoning navigation of the vehicle.

By including the elevation parameter, particularly changes in elevation, provided by elevation sensor 10, the error in measuring the distance travelled by the vehicle over the terrain from the known point is reduced. Thus, as briefly indicated earlier, such distances are usually measured by devices which measure the number of rotations of the vehicle wheels and then multiply the number of rotations by the known diameter of the wheels. However, such a distance measurement measures the linear distance travelled by the vehicle; therefore, if the vehicle is on an ascent or descent, the actually measured distance will include an error depending on the slope. That is, the correct dead reckoning distance desired is the horizontal component of the measured distance, so that the greater the slope, the greater the error in the computed instantaneous location of the vehicle.

However, since the system illustrated in FIG. 1 also measures the elevation, or merely the changes in elevation, the latter measurements may be used in the digital processor 8 for deriving, from the distance measurements by sensor 4, only the horizontal component of the distance actually travelled by the vehicle, thereby producing a more accurate determination of the instantaneous location of the vehicle.

In addition, by using the elevational data from the reference map 12, a new dimension of reference data is provided in the "map matching" technique for preventing an accumulation of errors. Thus, the reference points could also be identified by elevational data. For example, there is a change in sign in the elevation slope at the peaks and valleys in road ascents and descents. By providing the reference map 12 with the locations of the peaks and valleys of ascents and descents wherein a change in sign of the slope occurs, and comparing these points with the elevation changes of the travelling vehicle 2 as measured by its elevation sensor 10, the computation of the instantaneous location of the vehicle can be more frequently checked and corrected, thereby reducing the accumulation of errors.

In addition to matching the changes in sign in the elevation slope of the measured data with respect to the reference data, the changes in slope, or the complete elevation profile, may also be used for such matching purposes. The references elevation data is extracted from the 3-D map, and any point thereon can be calculated by interpolation, according to known techniques.

The digital computer 8 includes a control panel 14 for manually inputting data, including elevation-related data, in addition to the 3-D map stored in unit 12, and a display 16 for outputting the instantaneous location of the vehicle.

The elevation sensor 10 may be a barometer carried by the vehicle for measuring absolute values of the vehicle elevation over sea level. The absolute elevational measurements may be used for matching with the reference map. Such absolute values may also be used for computing changes in elevation, which in turn may be used for computing the horizontal component of the travelled distance, and also for determining the peaks and valleys (changes in sign) of the elevation slopes, and matched with the known locations of such peaks and valleys on the three-dimensional map 12. Changes in sign (peaks and valleys) are more easily detectable, but changes in gradient (slope) are also detectable particularly with respect to significant changes.

As indicated earlier, the distance sensor 4 may be a conventional odometer which measures the number of rotations of the vehicle wheels, and multiplies this measurement by the known diameter of the vehicle wheels, to determine the linear distance travelled by the vehicle. Any other distance-measuring means may be used, for example other means for measuring the vehicle speed and then accumulating the speed measurement over a period of time, to provide a distance measurement.

The direction (heading or azimuth) sensor 6 may comprise a magnetic-flux compass carried by the vehicle, or a plurality of gyroscopes carried by the vehicle. Such a sensor may also be one which measures the changes in steering direction of the vehicle, or which measures the differences in rotation with respect to the left and right wheels of the vehicle.

Figure 2:
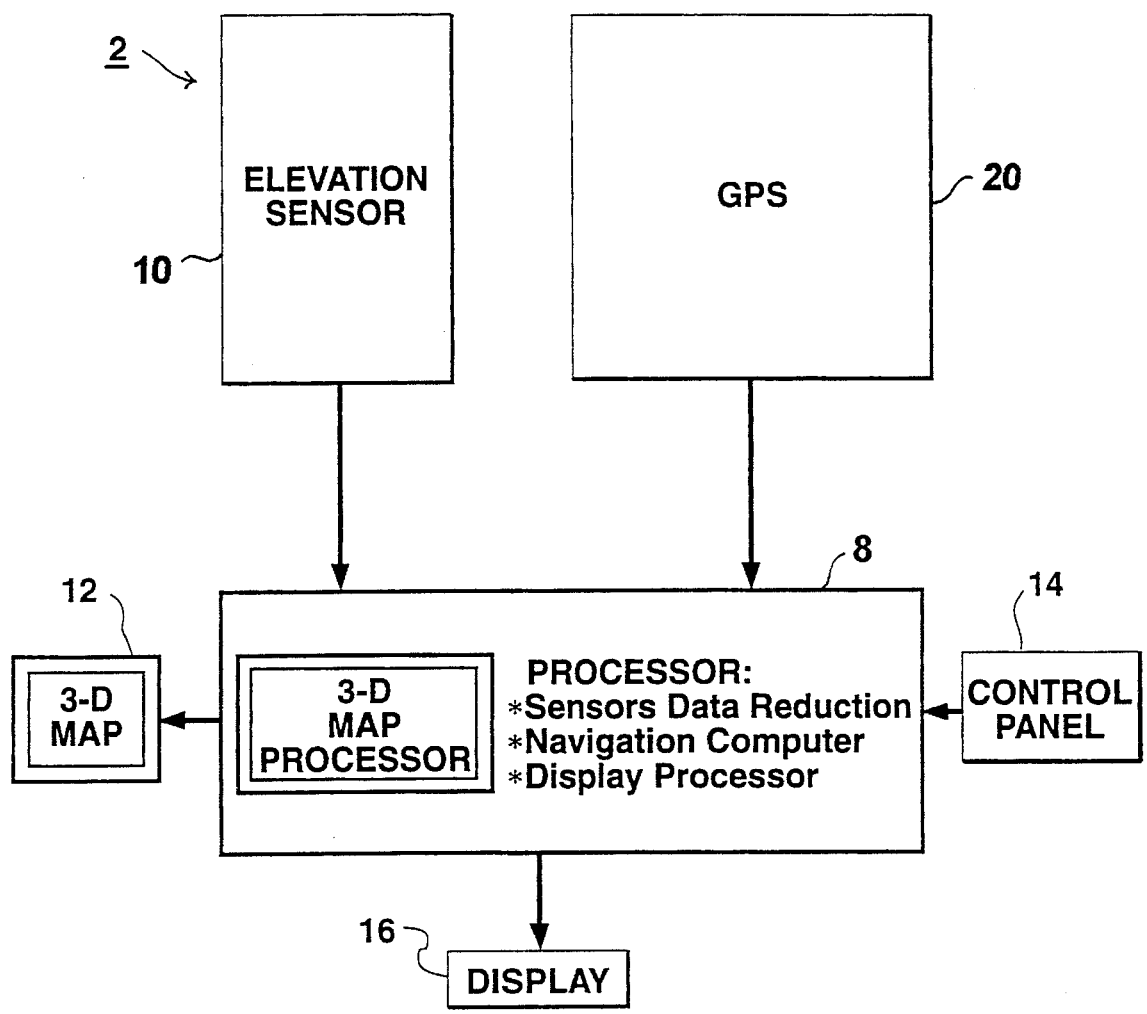
FIG. 2 is a block diagram illustrating a GPS navigation system constructed in accordance with the present invention.

The Embodiment of FIG. 2

FIG. 2 illustrates a system for locating the position of a vehicle travelling over a terrain when the approximate location of the vehicle has been obtained by a GPS (global positioning system). As indicated earlier, such global positioning systems are known, but for low-cost civilian applications, they are usually accurate only to about 150 meters. However, by measuring the elevation of the vehicle as it travels over the terrain, and including this parameter, the location of the vehicle as approximately obtained by the GPS may be more precisely determined.

Thus, in the system diagrammatically illustrated in FIG. 2, the vehicle, generally designated 2, need not include a distance sensor or a direction sensor as indicated by elements 4 and 6 in FIG. 1, but may include only an elevation sensor 10 for measuring the elevation of the vehicle as it travels over the terrain. The illustrated system further includes a GPS, indicated by block 20, for obtaining the approximate location of the vehicle, instead of computing this approximate location by dead reckoning as described above with respect to FIG. 1. By tracking four satellites, the elevation (altitude) can also be measured by the GPS.

The remainder of the system illustrated in FIG. 2 is substantially the same, and operates in substantially the same manner, as described above with respect to FIG. 1, except the processor 8 does not compute the approximate location by dead reckoning, but rather introduces the approximate location as obtained from the GPS 20.

The reference map, identified by Block 12 in FIG. 2, contains the 3-D map as in FIG. 1. Thus, the elevations of the measured data (either by sensor 10 or the GPS) used for determining the approximate location may be compared with the elevations of the reference data identifying known locations for correcting the approximate locations of the vehicle. For this purpose, the changes in sign in the elevation slope, the elevation slope itself or the complete elevation profile may be used in this comparison of the measured data with the reference data as described above with respect to FIG. 1.

Figure 3:
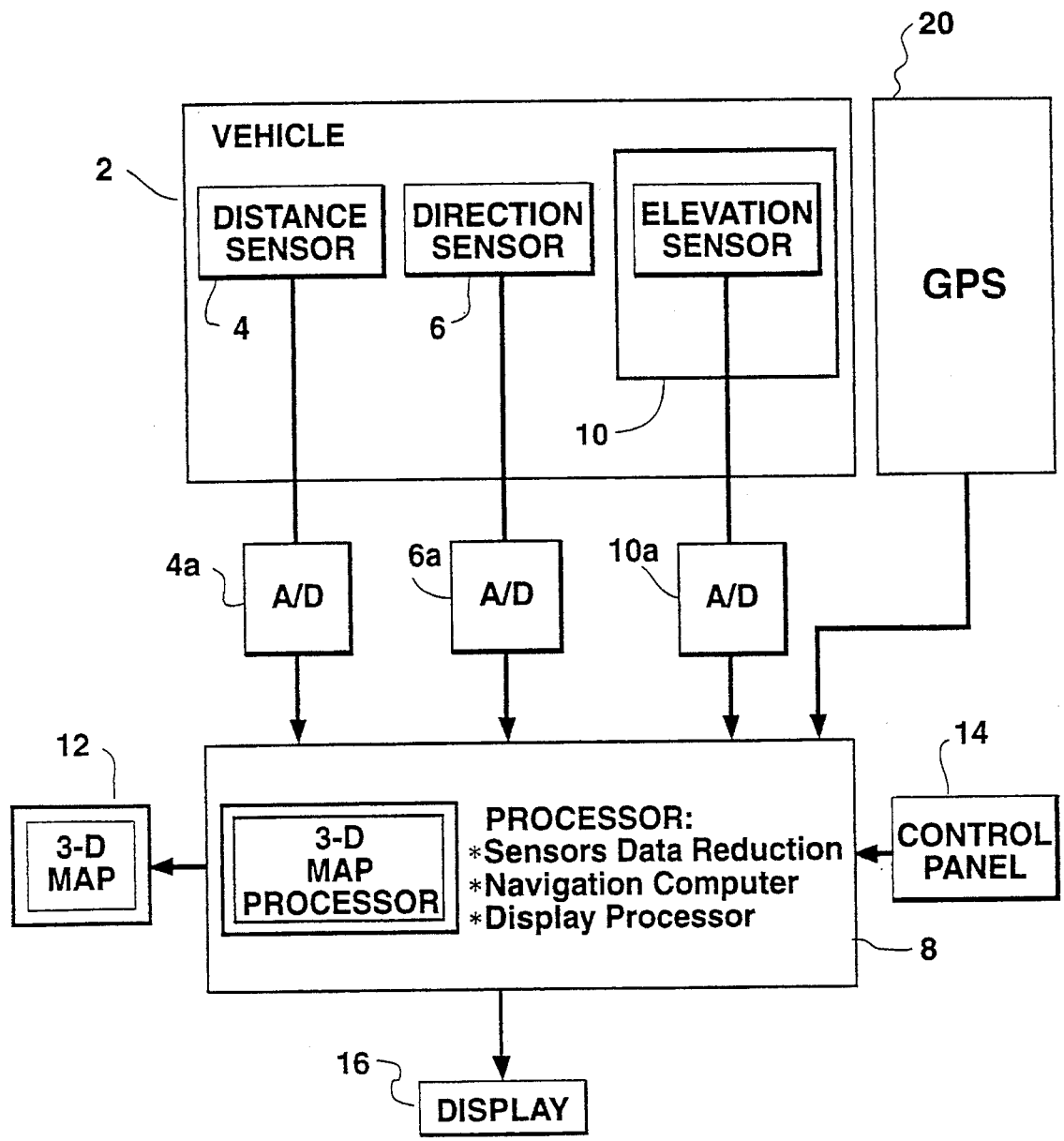
FIG. 3 is a block diagram illustrating a combined navigation system constructed in accordance with the present invention.

The Embodiment of FIG. 3

FIG. 3 illustrates a combination system including the determination of the approximate location of the object both by dead reckoning and by GPS data. It may be desirable to provide such a combination system for use both in the city and in open fields. Thus, when the vehicle is in the city, the tall buildings may interfere with the line of sight to the satellites in the GPS for determining the approximate location of the vehicle; and therefore the distance sensor 4 and the direction sensor 6 may be used for determining the vehicle's approximate location by dead reckoning. However, when the vehicle leaves the city so that there is no longer interference with the line of sight to the satellite, the GPS 20 may be used for determining the approximate location of the vehicle.

It is contemplated that the dead reckoning part of the system, including the distance sensor 4 and the direction sensor 6, may be incorporated in the vehicle itself, and the GPS 20, as well as the elevation sensor 10 and the other elements of the system illustrated in FIG. 3, may be constructed as a separate plug-in portable unit which the user can remove from the vehicle and use for locating his position by the GPS data while moving around away from the vehicle.

While the invention has been described with respect to several preferred embodiments, it will be appreciated that many variations, modifications and other applications of the invention may be made.

What is claimed is:

1. A method of determining the instantaneous location of a land vehicle travelling on a terrain, comprising the following operations:

measuring an approximate location of the land vehicle as said vehicle travels on the terrain by continuously measuring distances and headings of the land vehicle as said vehicle travels on the terrain from a known location, and determining the approximate location of said land vehicle by dead reckoning;

measuring changes in elevation of the land vehicle as said vehicle travels on the terrain;

continuously utilizing said measured changes in elevation for computing the horizontal component of said measured distances in order to determine the instantaneous location of the land vehicle on the terrain;

storing reference data which includes changes in sign in the elevation slope of known locations on said terrain; and utilizing the changes in sign in the elevation slope of the reference data having known locations, and the changes in sign in the elevation slope of the measured data whose location was determined by dead reckoning, for periodically correcting the instantaneous location of the land vehicle on said terrain.

2. The method according to claim 1, wherein said reference data includes a three-dimensional digital map of the terrain on which the vehicle is travelling.

3. The method according to claim 1, wherein said reference elevation data is extracted from a three-dimensional map.

4. A method of determining the location of a land vehicle travelling on a terrain, comprising the following operations:

(a) measuring an approximate location of the land vehicle as said vehicle travels on the terrain;

(b) measuring a parameter corresponding to the elevation of the land vehicle as said vehicle travels on the terrain; and (c) utilizing said measured elevation parameter of the land vehicle for correcting the measured approximate location of the vehicle to determine the instantaneous location of the land vehicle on said terrain; wherein:

said operation (a) is performed by determining the approximate location of the land vehicle by means of a three-dimensional satellite global positioning system;

said operation (b) measures changes in elevation of the land vehicle as said vehicle travels on the terrain; and said operation (c) is performed by (i) inputting and storing reference data which includes changes in sign in the elevation slope of known locations in said terrain; and (ii) utilizing the changes in sign in the elevation slope of the reference data and the known locations thereof, and the changes in sign in the elevation slope of the measured data whose approximate location was determined, for periodically correcting the instantaneous location of the land vehicle on said terrain.

5. Apparatus for determining the instantaneous location of a land vehicle travelling on a terrain, comprising:

(a) means for measuring an approximate location of the vehicle as said vehicle travels on the terrain;

(b) means for measuring changes in elevation of the land vehicle as said vehicle travels on the terrain; and (c) means for utilizing said measured changes in elevation of the vehicle for correcting the measured approximate location of the vehicle to determine the instantaneous location of the land vehicle on said terrain;

wherein said means (c) includes:

(i) storing means for storing from a three-dimensional map of the terrain travelled by the vehicle reference data representing known locations of changes in sign of the elevation slope of said terrain; and (ii) means for comparing the locations of the changes in sign in the elevation slope in the measured data with the locations of the changes in sign in the elevation slope in the reference data and for utilizing the known locations of the latter reference data for periodically correcting the instantaneous location of the vehicle.

6. The apparatus according to claim 5, wherein said means (a) includes means for measuring the approximate location of the vehicle by a three-dimensional satellite global positioning system.

7. The apparatus according to claim 5, wherein said elevation measuring means comprises a barometer carried by the vehicle for measuring the vehicle elevation over sea level.

8. The apparatus according to claim 6, wherein said elevational data is also obtained from a three-dimensional satellite global positioning system.

9. The apparatus according to claim 5, wherein said heading-measuring means comprises a magnetic-flux compass carried by the vehicle.

10. A method of locating a vehicle travelling over a terrain, comprising the following:

(a) measuring the approximate location of the vehicle as said vehicle travels over the terrain;

(b) measuring a parameter corresponding to the elevation of the vehicle as said vehicle travels over the terrain;

and (c) utilizing said measured parameter corresponding to the elevation of the vehicle for correcting the measured approximate location of the vehicle by:

(i) storing, as reference data, known locations on said terrain wherein a change in sign in the elevation slope occurs;

(ii) determining, from the measured parameter corresponding to the elevation of the vehicle, the locations where a change in sign occurs in the elevation slope of the terrain travelled by the land vehicle;

(iii) and utilizing the occurrences of changes in sign in the elevation slope of the terrain travelled by the land vehicle for correcting the measured approximate location of the land vehicle by the respective known location stored in the reference data.

11. The method according to claim 10, wherein said approximate location of the vehicle is measured by measuring the distances and headings of the land vehicle as said vehicle travels over the terrain from a known location, and determining said vehicle's approximate location by dead reckoning.

12. The method according to claim 11, wherein changes in the elevation of the land vehicle as said vehicle travels over the terrain are also utilized for computing the horizontal component of said measured distances in order to determine the approximate location of the land vehicle on said terrain.

13. The method according to claim 10, wherein said approximate location of the vehicle is measured by reference to a global positioning system.

14. The method according to claim 10, wherein said stored reference data is in the form of a three-dimensional map in digitized form of the terrain over which the land vehicle is to travel.

\* \* \* \* \*